United States Patent Office 3,784,597
Patented Jan. 8, 1974

3,784,597
PROCESS FOR PRODUCING A PARTIALLY
HYDROLYZED ACRYLAMIDE POLYMER
Takehiko Fujimoto, Masashi Okada, and Shigeo Inoue,
Kyoto, Japan, assignors to Sanyo Chemical Industries,
Ltd., Kyoto, Japan
Filed Dec. 16, 1971, Ser. No. 208,875
Claims priority, application Japan, Dec. 19, 1970,
45/114,562
Int. Cl. C08f 3/90, 27/14
U.S. Cl. 260—80.3 N                                    8 Claims

ABSTRACT OF THE DISCLOSURE

Acrylamide polymers and copolymers are partially hydrolyzed in an extruder from high concentration gel-like aqueous medium.

BACKGROUND OF THE INVENTION

Field of the invention

This invention relates to a partially hydrolyzed acrylamide polymer. As used herein, the term "acrylamide polymer" is intended to refer to either acrylamide homopolymers or acrylamide containing copolymers. More particularly, this invention relates to a process for hydrolyzing an acrylamide polymer in a gel-like aqueous medium of high concentration. As used herein the term "aqueous medium" is intended to refer to aqueous solutions, emulsions or dispersions.

Description of prior art

Partially hydrolyzed acrylamide polymers are among the more useful of the flocculants, for the flocculation of aqueous suspensions, such as in the treatment of industrial or residential sewage, or the like.

Partially hydrolyzed acrylamide polymers are of particular interest as aqueous suspension flocculating agents, which is finding increasing demand for use in the treatment of industrial sewage or the like.

Conventionally, acrylamide polymers are obtained by polymerizing the acrylamide, alone or with other monomers in very dilute aqueous solutions. The resulting polymer in the dilute aqueous solution is partially hydrolyzed with sodium hydroxide, sodium bicarbonate or sodium carbonate.

Very dilute aqueous solutions are necessary in the conventional hydrolysis process because high concentrations of acrylamide solutions, that is, solutions containing more than 10% by weight polymer, are usually very viscous, sticky, gel-like solutions.

While it has been considered to use other solvents instead of water to form the partially hydrolyzed acrylamide polymer solutions, only water has been shown to be a suitable medium for the hydrolysis reaction.

The difficulty with using such dilute solutions are that (a) they are degradable and perishable during storage, (b) they are inconvenient or difficult to transport and handle, since the bulk of the solution consists of water.

Although some attempts have been made to hydrolyze the high concentration gel-like solution of the acrylamide polymers, they have been largely unsuccessful, since it has been almost impossible to homogeneously distribute the base material through the thick gel solution, by ordinary stirring or mixing techniques. If more vigorous agitation is used, it can result in significant decomposition of the hydrolyzed polymer.

One reported attempt at hydrolysis of the gel state solution was to cut the solution into small particles of less than 0.5 inch in diameter and then to contact these particles with an alkaline solution. This technique has not proven to be successful, however, largely because the degree of hydrolysis is dependent upon the distance of the polymer molecule from the particle surface.

Accordingly, a need continues to exist for a technique of hydrolyzing acrylamide polymer in high concentrations.

SUMMARY OF THE INVENTION

Accordingly, it is one object of this invention to provide a process for partially hydrolyzing acrylamide polymers in a high concentration, without causing chain degradation.

It is another object of this invention to provide a process for partially hydrolyzing acrylamide polymers from an aqueous gel state.

These and other objects of this invention, as will hereinafter become more readily apparent, have been attained by homogeneously mixing a high concentration gel-like acrylamide polymer aqueous medium with an alkaline material, in an extruder.

BRIEF DESCRIPTION OF THE DRAWINGS

In describing this invention, reference shall be made to the accompanying drawings, in which.

DETAILED DESCRIPTION OF THE INVENTION

The acrylamide polymer medium used in this invention is an acrylamide polymer solution (or emulsion or dispersion) in an amount of at least 10% by weight, in water. Preferably, the concentration is between 15–50% by weight. Less than 10% by weight will cause the medium to have too low a viscosity for successful mixing in the extruder. Within the 15–50% by weight range, however, a gel-like state will be formed which can easily be handled by the extruder.

The acrylamide polymer used in this invention is preferably the homopolymer of acrylamide or a hydrophilic copolymer of acrylamide with less than 50%, and preferably less than 30% by weight of one or more suitable comonomers, such as: methacrylamide, acrylic acid, acrylonitrile, acrylic esters (e.g., methyl, ethyl, propyl and butyl acrylates), methacrylic esters (e.g., methyl, ethyl, propyl and butylmethacrylates), styrene, vinyl alkyl ethers, vinyl chloride, vinyl acetate and vinylidene chloride.

Suitable acrylamide polymers are those having a viscosity of at least 1000 cps. (usually, 1,000–15,000 cps. and preferably 3,000–10,000 cps.) as determined by a Brookfield viscometer, 12 rounds per minute, Roter #3, in 1% by weight aqueous solution at 30° C.

The acrylamide polymer containing medium is produced by polymerizing acrylamide with or without other comonomers, in an aqueous medium containing at least 10% by weight, and preferably 15–50% by weight of the monomer. Polymerization can be effected by any conventional technique such as by free radical polymerization using such catalysts as ammonium persulfate, potassium persulfate, sodium persulfate or azobisisobutyronitrile. Conventional reducing agents, such as sodium sulfite, sodium hydrogen sulfite, sodium thiosulfate, hydroxyl amine, hydrazine or ferrous ion, may be used therewith. Polymerization may be effected at temperatures of 20°–130° C. in an inert atmosphere. Any conventional reaction vessel may be used, preferably those having a bottom product outlet for discharging the gel-like polymer containing medium, usually at elevated pressures. Also, tubular-shaped reactors are quite suitable for this purpose.

The gel-like acrylamide polymer containing medium is homogeneously mixed with an alkaline material in an extruder at temperatures of 10°–150° C.

Any extruder which can provide the functions of continuous mixing and continuous extrusion can be used for this invention.

Figure 1:
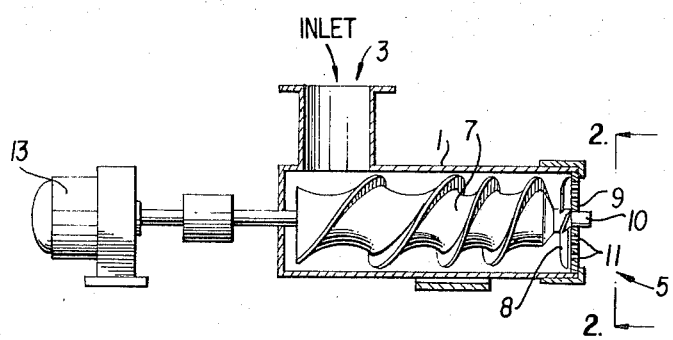
FIG. 1 is a partial cross-sectional view of an extruder which is suitable for the mixing operation of this invention.
Figure 2:
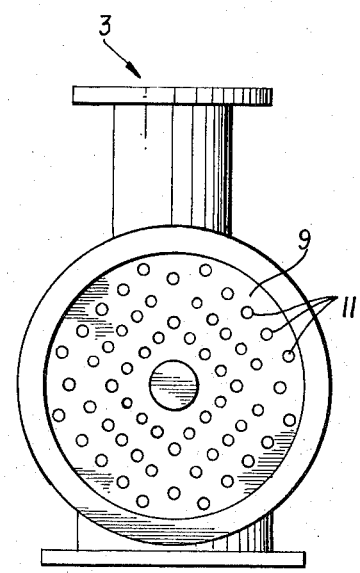
FIG. 2 is a front view of the extruder head of said extruder.
Figure 3:
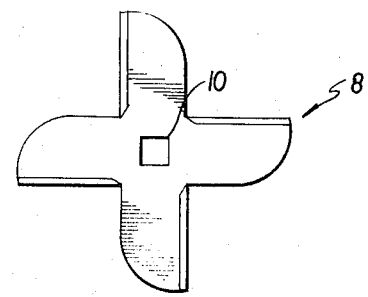
FIG. 3 is a cutting blade used at the outlet of the extruder.

One suitable extruder is shown in FIG. 1, showing a cylindrical housing 1 having an inlet 3 at one end, and an outlet 5 at the opposite end. A rotating screw agitator 7 is provided within the housing which not only homogeneously mixes the materials charged into the extruder but also transfers them from the inlet 3 to the outlet 5. As shown in FIGS. 1 and 2, the outlet has a nozzle plate 9 containing nozzle apertures 11 of diameter $d$. A cutting blade 8 shown in FIG. 3 is preferably attached to the shaft 10 of the rotating screw 7, inside of the outlet 5 of the extruder, which acts to cut the product into particles. The rotating screw is driven by motor 13.

The acrylamide polymer containing medium, preferably the aqueous solution, in its gel-like state and the alkaline material are introduced into the extruder through inlet 3 and are mixed and carried through the extruder to the outlet nozzle apertures 11 where they are extruded into a particle form.

Suitable alkaline materials which can be used for the hydrolysis are the alkali metal hydroxides (e.g., sodium and potassium hydroxides), and alkali metal salts of weak acids (e.g., sodium and potassium carbonates, bicarbonates, phosphates and carboxylates). The quantity of alkaline material is not critical and may vary over a wide range. It is preferable, however, to use at least an equivalent amount based on the number of amide groups to be hydrolyzed. The alkaline compound may be used in the form of an aqueous solution.

The product of this invention is a partially hydrolyzed acrylamide polymer, wherein the percentage of hydrolysis is generally 1–70% of all of the amide groups (preferably 5–50%).

This invention has the significant advantages that high concentrations of the acrylamide polymers can be hydrolyzed, and the resulting product will have a uniform degree of hydrolysis with very little degradation of the polymer carbon chain; that is, the product will have almost the same viscosity as the product obtained in a dilute aqueous solution by conventional techniques, and it will function as good flocculants.

Having generally described the invention, a further understanding can be attained by reference to the following examples which are presented as illustrative of this invention only, and it will be understood that the invention is not limited thereto unless otherwise specifically specified. The viscosities in the examples were determined in 1% by weight aqueous solution of acrylamide polymers or hydrolytes thereof. All parts are "by weight" unless otherwise specified.

EXAMPLE 1

Into a reaction vessel 8 cm. in diameter and 50 cm. in height having an outlet 2 cm. in diameter at the bottom of the vessel, was charged 250 parts of acrylamide and 750 parts of water. The mixture was heated at 20° C. under a nitrogen atmosphere. To the mixture was added 0.05 part of ammonium persulfate and 0.024 part of sodium hydrogen sulfite while stirring. The mixture was then maintained at 50–80° C. for 2 hours. There was obtained a gel-like polymer solution whose polymer had a viscosity of 1,200 cps.

The resulting gel-like polymer solution was discharged from the vessel through the outlet by use of nitrogen gas pressure, and mixed homogeneously with 56 parts of sodium hydroxide powder at 65° C. in an extruder as shown in the drawings, which comprises a cylinder 6 cm. in diameter and 15 cm. in length, having an inlet and an outlet, a rotating screw equipped therein in parallel, a blade attached to the screw at the outlet side, and a nozzle plate having many nozzle apertures (40% of opening) of 2 mm. in diameter. The retention time of the mixture in the extruder was about 30 seconds. There was obtained a gel-like hydrolyte solution whose polymer had a degree of hydrolysis of 38% by mole.

The resulting hydrolyte was compared with that produced by conventional methods, as to viscosity and flocculating properties. The results are provided in Table I, which show that no chain degradation occurred in the hydrolyte of this invention.

TABLE I

| Hydrolyte | Degree of hydrolysis, percent | Viscosity, cps. | Flocculating property |
|---|---|---|---|
| Hydrolyte of Example 1 | 38 | 2,300 | Good. |
| Conventional hydrolyte: | | | |
| (A) | 38 | 2,300 | Do. |
| (B) | 38 | 1,000 | Poor. |

NOTE.—Flocculating was observed by adding, respectively, 1 p.p.m. (active component) of hydrolyzed polymers to 0.5% by weight Mg(OH)$_2$ aqueous suspensions.

The conventional hydrolyte (A) in Table I was produced by diluting the gel-like polyacrylamide solution, obtained as in Example 1, with water to make a 3% by weight solution of the polymer, and hydrolyzing the resulting solution at 70° C. for 1 hour under mild agitation. The conventional hydrolyte (B) in Table I was produced by hydrolyzing a mass of the gel-like polyacrylamide solution (obtained as in Example 1) at room temperature under vigorous agitation.

EXAMPLE 2

Into a reaction vessel, 60 cm. in diameter and 200 cm. in height, having an outlet of 10 cm. in diameter at the bottom of the vessel, was charged 250 parts of acrylamide and 750 parts of water. The mixture was heated at 50° C. under a nitrogen atmosphere and to the mixture was added 0.025 part of ammonium persulfate while stirring. The mixture was then maintained at 90°–120° C. for 2 hours. There was obtained a gel-like polymer solution whose polymer had a viscosity of about 2,400 cps.

The resulting gel-like solution was discharged from the vessel through the outlet by applying nitrogen gas pressure and was introduced at 90° C. into the same type of extruder as in Example 1, except that the cylinder was 15 cm. in diameter and 60 cm. long, and the nozzle plate had nozzle apertures of 6 mm. in diameter, at about 30% of opening percentage. To the gel-like solution was added continuously 70 parts of 50% NaOH aqueous solution at the inlet of the extruder.

There was obtained a gel-like hydrolyte solution whose polymer had a degree of hydrolysis of about 25% by mole and viscosity of about 6,400 cps.

EXAMPLE 3

Example 2 was repeated, except using 225 parts of acrylamide, 25 parts of ethyl acrylate, 750 parts of water, 0.025 part of ammonium persulfate, and 40 parts of 50% NaOH aqueous solution. The copolymer in gel-like solution had a viscosity of about 1,300 cps. The final hydrolyte in the gel-like solution had a degree of hydrolysis of about 15% by mole and a viscosity of about 3,400 cps.

EXAMPLE 4

Example 2 was repeated, except using 225 parts of acrylamide, 25 parts of methyl methacrylate, 750 parts of water, 0.025 part of ammonium persulfate and 40 parts of 50% NaOH aqueous solution. The copolymer in gel-like solution had a viscosity of about 1,500 cps. The final hydrolyte in the gel-like solution had a degree of hydrolysis of about 15% by mole and a viscosity of about 3,600 cps.

Having now fully described the invention, it will be apparent to one of ordinary skill in the art that many changes and modifications can be made thereto without departing from the spirit or scope of the invention.

What is claimed as new and desired to be secured by Letters Patent is:

1. In a process for partially hydrolyzing an acrylamide polymer the improvement comprising forming a gel-like aqueous state containing at least 10% of acrylamide polymer wherein said acrylamide polymer contains less than 50% of a comonomer and has a viscosity of at least 1,000 cps. in a 1% by weight aqueous solution, admixing said gel with an alkaline material while maintaining a gel-like state, extruding said gel-like state acrylamide polymer so as to partially hydrolyze said polymer to a degree of 5–50%.

2. The process according to claim 1 in which the acrylamide polymer in the gel-like aqueous solution is a solution of an acrylamide polymer which has been produced by polymerizing acrylamide or a mixture of acrylamide with at least one comonomers in an aqueous solution of at least 10% by weight.

3. The process according to claim 1 in which the alkaline compound is an alkali metal hydroxide or an alkali metal salt of a weak acid.

4. The process according to claim 1 in which the acrylamide polymer in a gel-like aqueous solution form and the alkaline material is continuously mixed and continuously extruded.

5. The process according to claim 1 which comprises feeding the gel-like aqueous solution and the alkaline material into an extruder inlet, longitudinally transferring while simultaneously homogeneously mixing said solution and said alkaline material, and extruding said mixed product through an extrusion outlet.

6. The process according to claim 5, wherein the product is extruded in small pieces.

7. The process according to claim 1 in which the alkaline material is used in approximately an equivalent amount based on the amide groups in the acrylamide polymer to be hydrolyzed.

8. The process according to claim 1 in which the hydrolysis is carried out at temperatures of 10°–150° C.

References Cited

UNITED STATES PATENTS

| | | | |
|---|---|---|---|
| 2,561,205 | 7/1951 | Jones | 260—89.7 |
| 2,886,558 | 5/1959 | Friedlander | 260—89.7 |
| 3,022,279 | 2/1962 | Proffitt | 260—89.7 |
| 3,042,970 | 7/1962 | Terenzi | 18—47.3 |
| 3,247,171 | [4/1966 | Walker | 260—80.3 |
| 3,255,142 | 6/1966 | Terenzi | 260—29.6 |

JOSEPH L. SCHOFER, Primary Examiner

C. A. HENDERSON, Jr., Assistant Examiner

U.S. Cl. X.R.

260—85.7, 87.5 R, 87.7, 88.1 PN, 89.7 S; 264—140